April 18, 1933. N. D. LEVIN 1,904,488

COAL CUTTING MACHINE

Original Filed Aug. 15, 1929 4 Sheets-Sheet 1

April 18, 1933.                    N. D. LEVIN                    1,904,488
                              COAL CUTTING MACHINE
                    Original Filed Aug. 15, 1929      4 Sheets-Sheet 3
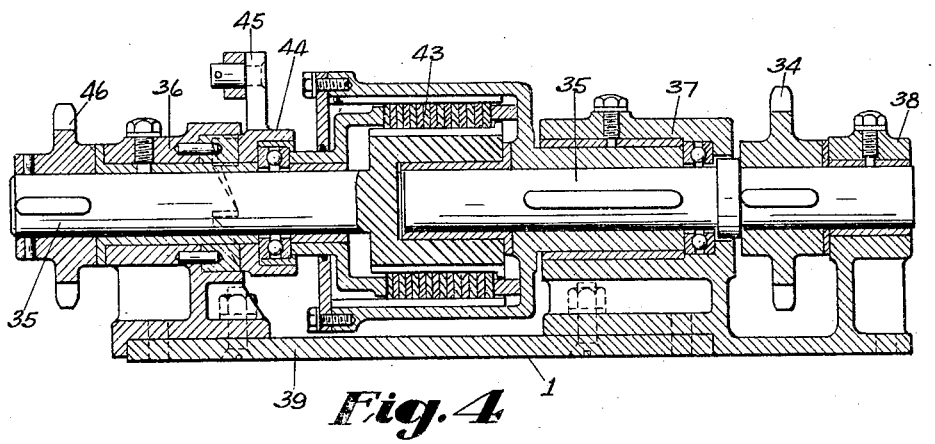
Fig. 4
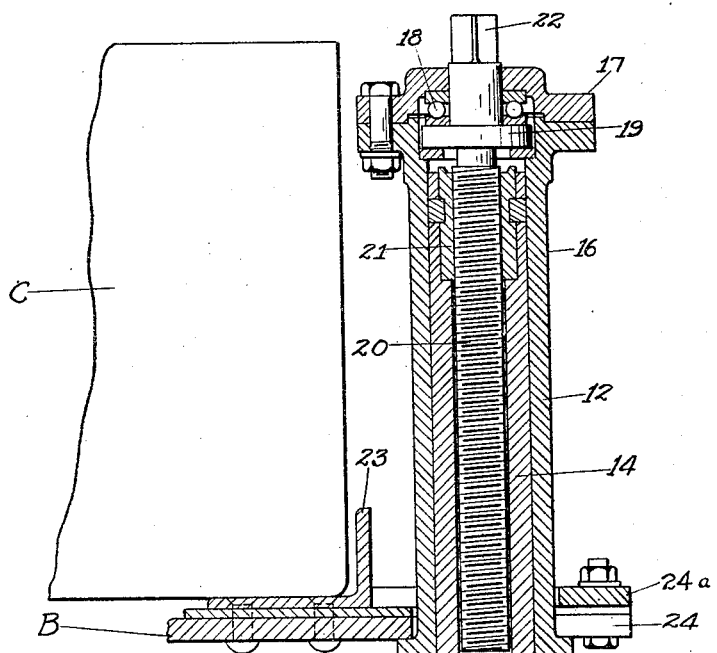
Fig. 5
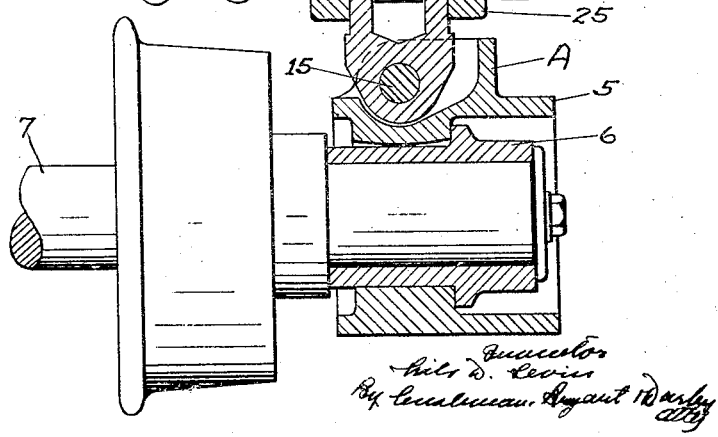

April 18, 1933.   N. D. LEVIN   1,904,488
COAL CUTTING MACHINE
Original Filed Aug. 15, 1929   4 Sheets-Sheet 4

Patented Apr. 18, 1933

1,904,488

UNITED STATES PATENT OFFICE

NILS D. LEVIN, OF COLUMBUS, OHIO, ASSIGNOR TO THE JEFFREY MANUFACTURING COMPANY, OF COLUMBUS, OHIO, A CORPORATION OF OHIO

COAL CUTTING MACHINE

Application filed August 15, 1929, Serial No. 386,138. Renewed November 20, 1931.

The present invention relates to certain new and useful improvements in coal cutting machines of the type adapted to rest upon and travel along the rails of a mine track and to be positioned adjacent the coal face to cut an arcuate kerf therein while supported upon and braced by the rails of a track extending perpendicularly towards said coal face.

The especial object of this invention is to provide in a machine of the class described, improved feeding mechanism whereby the cutting element of the machine may be moved either toward the right hand or toward the left hand at the option of the operator.

A further object is to provide feeding mechanism of the class described adapted to move the cutting element at either of a plurality of speeds suitable for the cutting operation or at a more rapid speed suitable for handling the machine.

A further object is to provide improved truck mounting for the machine whereby it may be conveniently and expeditiously moved from one working place to another and may be positioned relative to the coal body which is to be cut.

The means whereby I attain these and other objects will be fully set forth in the following specification and illustrated in the accompanying drawings, of which—

Fig. 4 is a sectional view taken along the line IV—IV of Fig. 3.

Fig. 5 is a sectional view taken along the line V—V of Fig. 1.

Like numerals refer to similar parts in the several figures.

Figure 1:
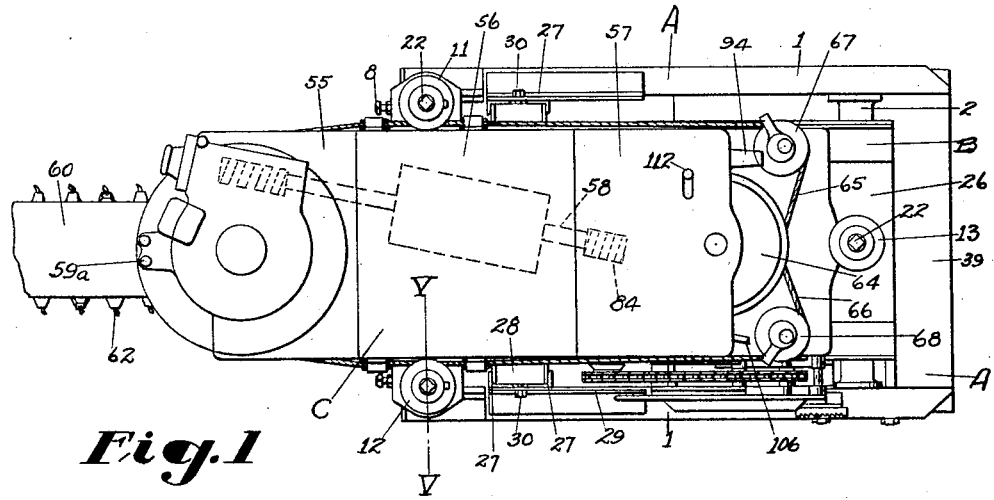
Fig. 1 is a general plan view of the preferred embodiment of my invention.
Figure 2:
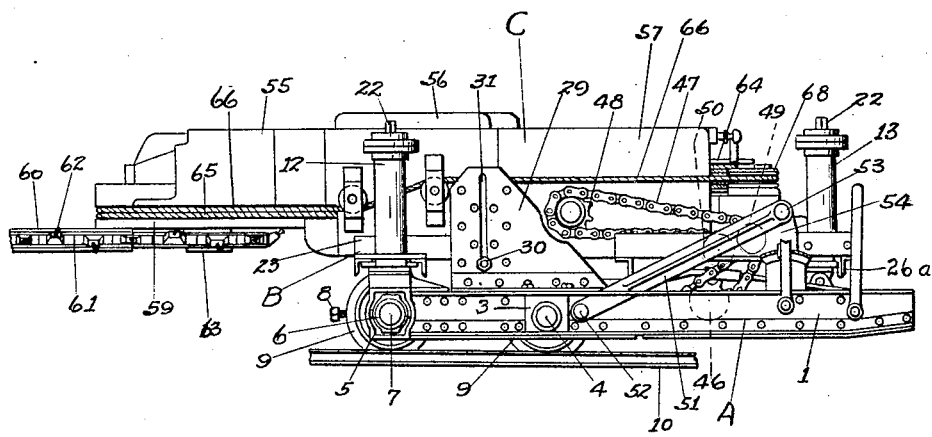
Fig. 2 is a side elevation of the machine illustrated in Fig. 1.
Figure 6:
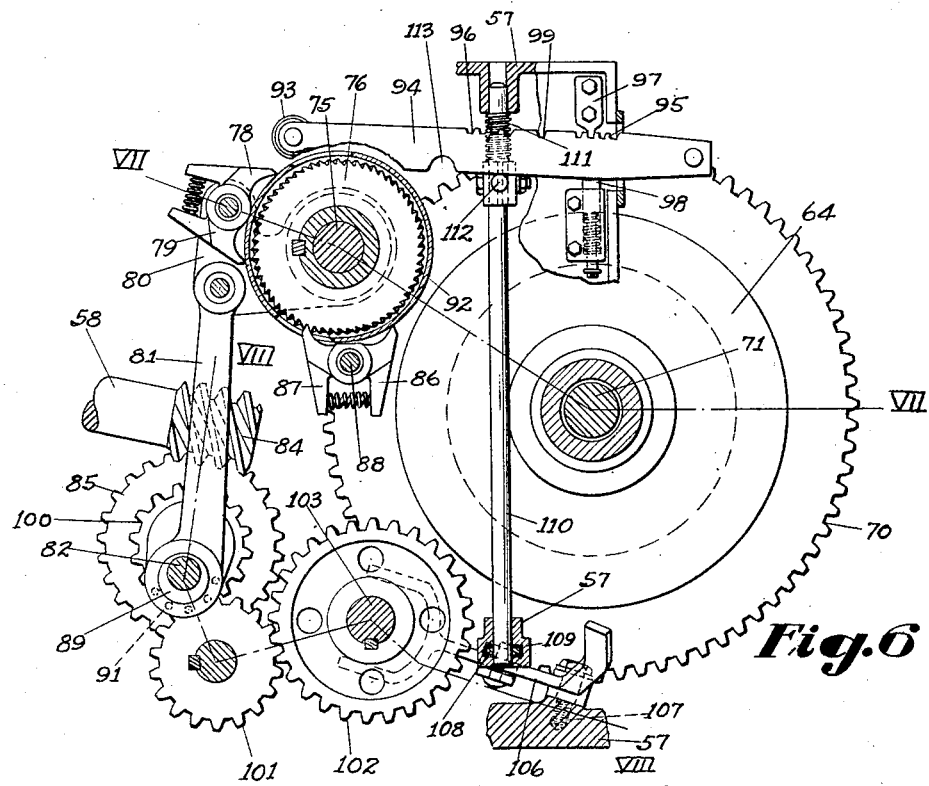
Fig. 6 is a diagrammatic plan view of the feeding mechanism of the machine.
Figure 3:
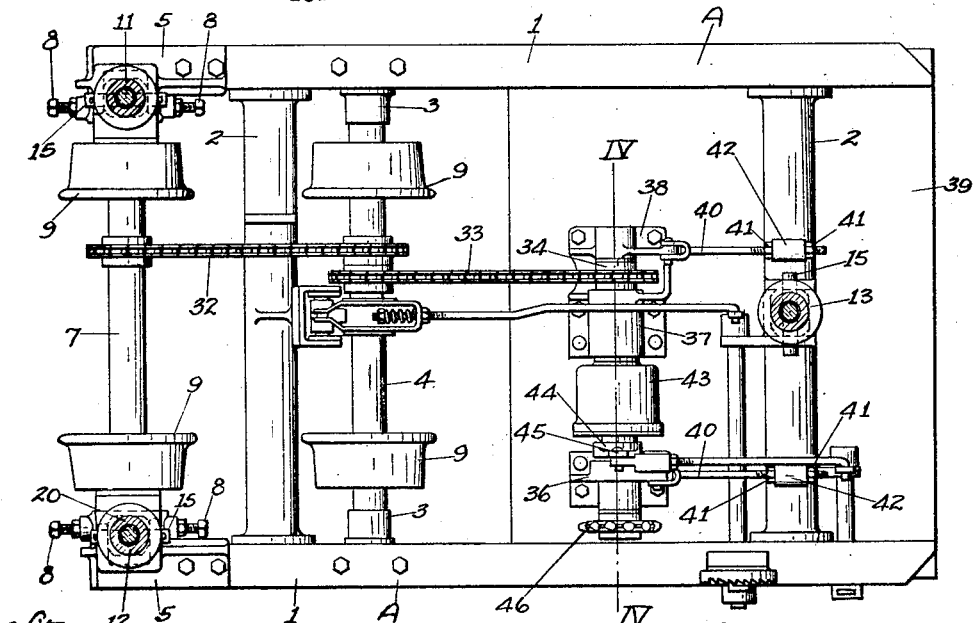
Fig. 3 is a plan view of the truck body, the upper parts of the machine being broken away to reveal the parts below.
Figure 7:
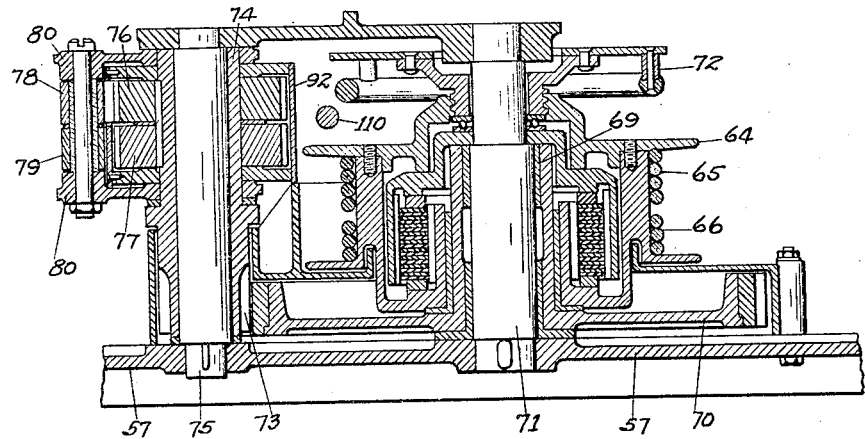
Fig. 7 is a sectional view taken along the line VII—VII of Fig. 6.
Figure 8:
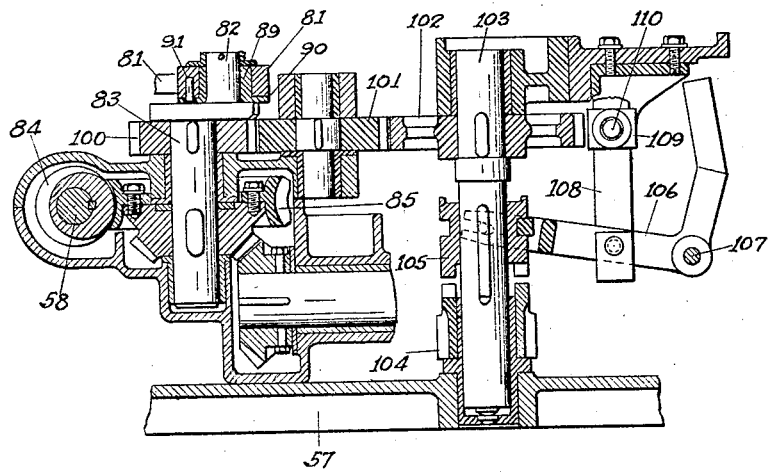
Fig. 8 is a sectional view taken along the line VIII—VIII of Fig. 6.

As shown in the drawings, my improved coal cutting machine comprises a wheel supported track guided truck "A" having a vertically adjustable platform "B" upon which is mounted a complete self-contained coal cutting element "C", which, while operable independently of the supporting truck mechanism, is securely attached thereto. The cutting element "C" is provided with a horizontally projecting pivotally mounted kerf cutter adapted to swing either to the right or to the left to engage the coal body in front of the machine to form an arcuate kerf therein.

The truck "A" comprises the longitudinally extending side frames 1 and the cross members 2 which are securely joined to form a rigid frame of generally rectangular shape. To the side frames 1 are fixed journal boxes 3 in which the rear axle 4 is journaled, and yoke castings 5 wherein are slidably mounted journal boxes 6 for the forward axle 7 under the control of the adjusting screws 8. To the axles 4 and 7 are fixed traction wheels 9 adapted to rest upon and travel along the rails 10 of a mine track. Projecting upwardly from the truck frame "A" are three pedestals 11, 12 and 13 upon which the platform "B" is supported for vertical adjustment. As these pedestals are alike, a description of one will apply to all.

As shown in Fig. 5 of the drawings, a cylindrical column 14 is pivotally attached to the truck frame by a pivot pin 15 which, in the pedestals 11 and 12, extends longitudinally of the truck frame, while in the pedestal 13, it extends transversely thereof. Slidable upon the column 14 is a cylindrical sleeve 16, to the upper end of which is bolted a cap 17, the parts being proportioned to form a chamber wherein is mounted an antifriction bearing 18 which bears upon a collar 19 formed integral with a screw shaft 20. The screw shaft 20 extends downwardly into the central cavity of the column 14 and is in screw threaded engagement with a nut 21 fixed in the upper part of said column. The projecting end of the shaft 20 is squared at 22 for convenient engagement with a suitable wrench whereby the screw shaft 20 may be rotated to effect vertical adjustment of the sleeve 16. The platform "B" is of generally rectangular form and is provided along its lateral edges with upstanding flanges 23 adapted to engage the frame of the cutting element "C" to prevent its lateral displacement. At the forward corners of the platform "B" are laterally projecting lugs 24 having suitable recesses, open outwardly, through which the pedestals 11 and 12 project, and these lugs engage the annular flanges 25 formed at the lower end of the sleeves 16. The pedestals are retained in position by means of plates 24a bridging the outer extremities of the recesses, and all of the pedestals fit somewhat loosely in their receiving apertures to permit free universal angular adjustment of the platform relative to the horizontal. In like manner the pedestal 13 projects through and engages the floor plate 26 in the central vertical longitudinal plane of the machine. The above described mechanism is such as to afford a three point support upon which the platform "B" may be vertically adjusted either in horizontal planes or in planes inclined to the horizontal. A lug 26a fixed to floor plate 26 of frame "B" is adapted to engage under the flange 25 of pedestal 13 to limit upward movement of the frame relative thereto.

In order to maintain the platform "B" in operative position directly above the truck body, I have provided vertical guide members at each side of the machine comprising two parallel vertically disposed angle bars 27, the inwardly projecting flanges of which engage the projecting ends of the cross-member 28 of the platform "B". The angle bars 27 are secured to the side frames 1 by broadly extending gusset plates 29 and tie bolts 30 projecting from the cross-members 28 through vertical slots 31 in the gusset plates 29 engage the outer surface of said gusset plates to tie these parts together and prevent their accidental disengagement.

The truck axles 4 and 7 are connected together by an endless chain 32 engaging suitable sprocket wheels fixed to the axles, and a similar chain 33 connects the axle 4 with a sprocket wheel 34 keyed to the countershaft 35 which is mounted in journal bearings 36, 37 and 38 secured to the floor plate 39 of the truck body. Provision for tensioning the chain 32 is made in the adjustable axle bearings 6, and the chain 33 may be tensioned by adjustment of the bearings 36, 37, and 38 under the control of the rods 40 and nuts 41 which engage the lugs 42 of the cross-member 2. The countershaft 35 is formed in two parts which may be operatively connected together by a multiple disc friction clutch 43, the discs of which are adapted to be compressed by rotation of the collar 44 having inclined jaw teeth in engagement with similar teeth formed upon the end of the journal bearing 36 in the common and well understood manner. A lever 45 formed integral with the collar 44 affords convenient means for rotation of the collar 44 and control of the friction clutch. Keyed to the shaft 35 is a sprocket wheel 46 which is connected by an endless chain 47 with a similar sprocket wheel 48 projecting from the side of the cutter element "C" and which is operatively connected with the power devices of the machine. The chain 47 is engaged by two sprocket wheels 49 and 50 mounted upon suitable stud shafts attached to a lever 51. The lever 51 is pivoted at its lower end upon a pin 52 fixed in the side frame 1, and at its upper end upon a pin 53 fixed to a member 54 adapted to slide longitudinally of the machine in guideways of the platform "B." When the platform "B" is elevated, the member 54 slides forwardly of the machine and the lever 51 swings upwardly, the proportions of the parts being such that the tension of the driving chain 47 is maintained in all positions of vertical adjustment of the platform "B."

Positioned upon the platform "B", and preferably securely attached thereto, is the coal cutting element "C" having a main frame composed of three sections 55, 56, and 57 which are joined together by suitable fastenings not shown in the drawings. The middle section 56 comprises the electric motor by which the machine is actuated. The armature 58 of this motor extends longitudinally of the machine and is connected by suitable gearing contained within the forward frame section 55 with the cutting mechanism, and by other gearing in the rearward frame section 57 with the feeding mechanism to be hereinafter more fully described. Suitable controlling devices are provided for the control of the actuation of the motor, but as such devices are well understood in the art and as they form no part in the present invention, further description and illustration is not thought to be required at this time.

Supported by the forward frame section 55 is a horizontally disposed turntable 59 to which is attached an elongated horizontally projecting cutter frame 60 in the lateral edges of which are formed guideways wherein travels the endless cutter chain 61. The cutter chain 61 is provided with renewable cutter bits 62 adapted, when the cutter arm is presented edgewise to the coal body, to cut a kerf therein. The cutter chain 61 passes around and is actuated by a sprocket wheel 63 concentric with the turntable and operatively connected with the power elements of the machine. Since the power transmitting devices here contemplated are well understood in the art, and since they form no part in the present invention, their illustration and description is not thought to be required at this time. The turntable 59 may be locked in any preferred position of angular adjustment by the engagement of a pin 59a with registering holes in the body of the turntable and in the machine frame in the manner which is common in mining machines of this class.

The feeding mechanism comprises a winding drum 64 upon which is windable, in opposite directions, two feed ropes 65 and 66 which, after passing over the guide pulleys 67 and 68, are carried forward along opposite sides of the machine frame, laid in a suitable groove formed in the periphery of the turntable 59 and attached thereto in such manner that when the drum 64 revolves in a clockwise direction the rope 65 will be wound to swing the cutter arm 60 from left to right, and when said drum revolves in anticlockwise direction the rope 66 will be wound to swing the cutter arm 60 from right to left.

The drum 64 is journaled upon the extended hub 69 of a spur gear wheel 70 which is freely rotatable about the shaft 71 fixed in the frame section 57. The drum 64 is connectible to the hub 69 by means of a multiple disc friction clutch of the common and well known type which is mounted within the body of the drum 64 and is controllable by manipulation of the hand wheel 72 in the usual and well understood manner.

The spur gear 70 is engaged by a spur pinion 73 formed upon the lower end of the sleeve 74 which is journaled upon a shaft 75 fixed in the frame 57 of the machine. Keyed to the sleeve 74 are two oppositely disposed ratchet wheels 76 and 77, adapted to engagement respectively by the pawls 78 and 79 which are pivotally mounted upon the rocker arm 80. The rocker arm 80 is pivoted upon the sleeve 74 and is connected by means of the connecting rod 81 with a crank pin 82 for its reciprocation. The crank pin 82 is formed integral with the crank shaft 83 operatively connected with the armature shaft 58 through the worm 84 and worm wheel 85. Other pawls 86 and 87 mounted upon a pivotal pin 88 fixed in the machine frame 57, are adapted to engage the ratchet wheels 76 and 77, respectively, to prevent their retrograde movement. In order to secure perfect cooperation between the driving pawls 78 and 79 and their respective retaining pawls 86 and 87, I have provided means for the adjustment of the length of the connecting rod 81 by the use of an eccentric bushing 89 in the pivot bearing of the rod 81 upon the crank pin 82. The bushing 89 has a broadly expanded flange 90 pierced by a plurality of spaced apart apertures adapted to be engaged by a pin 91 also engageable with the bearing portion of rod 81 whereby said bushing may be locked in the preferred position of rotary adjustment relative to the rod 81.

A cylindrical shield 92 surrounding the ratchets 76 and 77 is adapted to hold all of the pawls 78, 79, 86 and 87 out of engagement with their respective ratchets. The shield 92 is provided with apertures through which the pawls 78 and 87 may project to engage the ratchet 76 when said shield is in one position of adjustment, and with other apertures through which the pawls 79 and 86 may project to engage the ratchet 77 when said shield is in another position of adjustment. The shield 92 is rotatably supported concentric with the shaft 75 and has a lug 93 to which is pivotally attached a control bar 94 by the longitudinal movement of which the shield 92 may be rotated about its axis. In the bar 94 there are formed two groups of notches 95 and 96 adapted to engage a detent 97 to hold the shield 92 in the selected position of angular adjustment. A spring actuated pressure foot 98 serves to hold the bar 94 in contact with the detent 97. These parts are so proportioned that when the detent 97 is in one of the notches of the group 95 and 96, the appropriate apertures in the shield 92 will be in position to allow the respective pawls to engage their respective ratchet wheels. The velocity of rotation of the drum 64 depends upon the number of teeth of the ratchet passed over by the driving pawl at each recession of the rocker arm, and this is controlled by the position of the shield 92, the spacing of the notches in each group of the control bar corresponding with the pitch of the teeth of the ratchet. A single notch 99 positioned midway between the groups 95 and 96 serves to hold the shield 92 in its neutral position. By the power transmission devices above described, the drum 64 may be caused to revolve in either direction at relatively low speeds suitable for feeding the cutter arm into the coal.

After the cutter arm 60 has been swung through the desired arc of cutting, it is desirable that it be quickly returned to its central traveling position parallel with the trackway, and for this purpose I have provided auxiliary power transmission devices for the more rapid revolution of the drum 64. Fixed to the crank shaft 83 is a spur gear 100 which is operatively connected by an idler gear 101 with a gear 102 keyed to a vertical shaft 103 supported in journal bearings of the machine frame. Freely rotatable upon the shaft 103 is a spur pinion 104 which engages the spur gear 70 by which the feed drum 64 is rotated. A jaw clutch member 105 splined to the shaft 103 is adapted to connect the pinion 104 with the shaft 103 to drive the gear 70 at relatively high speed. The clutch 105 is controlled by a shifting lever 106 pivotally supported upon the pin 107 fixed in the machine frame 57. Attached to the shifting lever 106 is a bar 108 vertically slidable in guideways 109 of the machine frame. The bar 108 is pierced by an aperture which is in alinement with a horizontally extending locking bar 110 when the clutch member 105 is in its disengaged position. The locking bar 110 is longitudinally slidable in guideways of the machine frame and tends to move into the aperture in the bar 108 under the influence of the spring 111 to thereby lock the shifting lever 106 to hold the clutch member 105 out of engagement with the pinion 104. Projecting upwardly from the bar 110 is a lug 112 which projects above the cover plates of the machine and serves as a handle whereby the operator may move the locking bar 110 out of engagement with the bar 108. The lug 112 is adapted to engage the edge of the control bar 94 which prevents movement of said locking bar out of engagement with the bar 108. A notch 113 formed in the edge of the control bar 94 is so disposed that when the detent 97 engages the central notch 99 the lug 112 may find clearance into which it may be moved to thereby unlock the shifting lever 106 and permit the clutch 105 to operatively connect the pinion 104 with the shaft 103. At the same time engagement of the lug 112 with the notch 113 prevents longitudinal movement of the control bar 94 and the actuation of the ratchet mechanism. By the devices above described the control mechanisms are so interlocked as to prevent actuation of the ratchet mechanism when the auxiliary feeding devices are connected, and to prevent actuation of said auxiliary devices while the ratchet mechanism is being used.

In operation, the machine travels under its own power from one working place to another, variations of speed being obtained either by the control of the electric motor or by manipulation of the clutch lever 45 to permit more or less slippage of the friction clutch 43. Upon arrival in a mine room the supplemental feeding mechanism is actuated to quickly swing the cutter arm 60 to the desired angular position for beginning the cut. The truck is then moved bodily forward into close proximity with the working face and the brake applied to hold the machine in that position. After the platform "B" has been vertically adjusted to position the cutter bar 60 at the desired elevation, the ratchet feeding mechanism will be actuated to swing the cutter arm in kerf cutting direction, the rate of feeding being controlled by manipulation of the control bar 94 to meet varying conditions of cutting. Transverse strains transmitted to the machine frame "C" upon operation of the cutter bar will cause a swinging of pedestals 11 and 12 about their axes 15. This movement will be limited, however, by abutment of the upper end of one or the other of the pedestals against the machine frame, depending upon the direction of the strain.

After completion of the kerf the auxiliary feeding mechanism may again be used to quickly return the cutter arm to its central or traveling position. The normal or customary direction of cutting is from right to left, under which conditions the auxiliary feeding mechanism will move the cutter arm from left to right. Occasionally local conditions in the mine make it desirable to cut from left to right. To accomplish this the motor will be reversed by means of the electric controlling devices of the machine, and the cutter bits reversed in the cutter chain. After this adjustment the ratchet feeding mechanism may be manipulated to swing the cutter bar from left to right and the auxiliary feeding mechanism to swing it from right to left. Aside from arc wall cuts, the machine is of course adapted to make long wall cuts in the usual manner.

By the devices above described I have provided an improved coal cutting machine whereby an arcuate kerf may be formed in a coal face while the machine is supported upon and braced by the rails of a mine track extending perpendicular to said face, the cutting mechanism being fed either from right to left or from left to right at the option of the operator at either of a plurality of cutting speeds which he may select, or it may be swung in the reverse direction at a higher speed for more convenient handling of the machine.

What I claim is:—

1. In a machine of the class described, the combination with a support, of a horizontally projecting kerf cutter pivotally mounted thereon, means to rotate said kerf cutter about its pivotal support comprising a reversible winding drum mounted on said support, oppositely disposed flexible draft elements connected to said kerf cutter and alternately windable upon said drum depending on its direction of rotation, optionally controlled ratchet mechanism adapted to rotate said drum in either direction, other means to rotate said drum in the preferred direction, and interlocking means to prevent the simultaneous actuation of the ratchet means and other means as and for the purpose set forth.

2. In a machine of the class described, the combination with a wheel supported carriage adapted to rest upon and travel along the rails of a mine track, a supporting frame mounted upon said carriage and vertically adjustable relative thereto, power devices carried by said supporting frame, optionally controlled means actuated by said power devices to propel said carriage along said track, a horizontally projecting kerf cutter pivotally supported on said supporting frame actuated by said power devices and adapted to cut a kerf in a coal face extending transversely of said track, a winding drum carried by said supporting frame, oppositely disposed flexible draft elements alternately windable upon said drum depending on its direction of rotation connected and arranged to rotate said kerf cutter about its pivotal support, optionally controlled means to rotate said drum in either direction at relatively low speed, and other means adapted to rotate said drum in the preferred direction at relatively high speed as and for the purpose set forth.

3. In a machine of the class described, the combination with a wheel supported carriage adapted to rest upon and travel along the rails of a mine track, means to propel said carriage along said track, a supporting frame mounted upon said carriage and vertically adjustable relative thereto, power devices carried by said supporting frame, a horizontally projecting kerf cutter pivotally supported upon said supporting frame actuated by said power devices and adapted to cut a kerf in a coal face extending transversely of said track, a winding drum carried by said supporting frame, oppositely disposed flexible draft elements alternately windable upon said drum depending on its direction of rotation connected and arranged to rotate said kerf cutter about its pivotal support, ratchet mechanism adapted to rotate said drum at relatively low speed to swing said kerf cutter in cutting direction, and other means adapted to rotate said drum in the reverse direction at relatively high speed as and for the purpose set forth.

4. In a machine of the class described, the combination with a wheel supported carriage adapted to rest upon and travel along the rails of a mine track, a supporting frame mounted upon said carriage and vertically adjustable relative thereto, power devices carried by said supporting frame, optionally controlled means actuated by said power devices to propel said carriage along said track, a horizontally projecting kerf cutter pivotally supported on said supporting frame and actuated by said power devices and adapted to cut a kerf in a coal face extending transversely of said track, a winding drum carried by said supporting frame, oppositely disposed flexible draft elements alternately windable upon said drum depending on its direction of rotation connected and arranged to rotate said kerf cutter about its pivotal support, optionally controlled ratchet mechanism adapted to rotate said drum in either direction at either of a plurality of relatively low speeds, and other means to rotate said drum in the preferred direction at relatively high speed as and for the purpose set forth.

5. In a machine of the class described, the combination with a wheel supported carriage adapted to rest upon and travel along the rails of a mine track, a supporting frame mounted upon said carriage and vertically adjustable relative thereto, power devices carried by said supporting frame, optionally controlled means actuated by said power devices to propel said carriage along said track, a horizontally projecting kerf cutter pivotally supported on said supporting frame and actuated by said power devices and adapted to cut a kerf in a coal face extending transversely of said track, a winding drum carried by said supporting frame, oppositely disposed flexible draft elements alternately windable upon said drum depending on its direction of rotation connected and arranged to rotate said cutter about its pivotal support, optionally controlled ratchet mechanism adapted to rotate said drum in either direction at either of a plurality of relatively low speeds, other means to rotate said drum in the preferred direction at relatively high speed, and interlocking mechanism to prevent the simultaneous actuation of said ratchet mechanism and said other means as and for the purpose set forth.

6. In a machine of the class described, the combination with a wheel supported carriage adapted to rest upon and travel along the rails of a mine track, means to propel said carriage along said track, a supporting frame mounted upon said carriage and vertically adjustable relative thereto, power devices carried by said supporting frame, a horizontally projecting kerf cutter pivotally supported upon said supporting frame actuated by said power devices and adapted to cut a kerf in a coal face extending transversely of said track, a winding drum carried by said supporting frame, optionally disposed flexible draft elements alternately windable upon said drum depending on its direction of rotation connected and arranged to rotate said kerf cutter about its pivotal support, optionally controlled means to rotate said drum in either direction at relatively low speed, and other means adapted to rotate said drum in the preferred direction at relatively high speed as and for the purpose set forth.

7. In a mining apparatus, a movable base, a plurality of vertical pedestals pivoted to the base at their lower ends, and a frame loosely engaging the pedestals above their pivotal axes, the pivoting axis of one of the pedestals being at an angle to the pivoting axis of another of the pedestals whereby the pivoting movements of the pedestals are mutually limited.

8. In a mining apparatus, a movable base, a plurality of vertical pedestals pivoted to the base at its forward portion on longitudinally extending pins for oscillation in a transverse plane relative to the base, a further pedestal to the rear of the others and pivoted at its lower end to the base on a transverse pin for oscillation in the longitudinal direction of the base, and a frame loosely engaging all the pedestals above the pivotal axes, the forward and rearward pedestals mutually limiting the pivotal movements of each other.

9. In a mining apparatus, a movable base, a plurality of vertical pedestals pivoted to the base at their lower ends, a frame loosely engaging the pedestals above their pivotal axes, and a mining machine mounted on said frame between a pair of said pedestals, the abutment of the upper ends of said pair of pedestals against the machine serving to limit oscillatory movements of the pedestals.

10. In a mining apparatus, a movable base, a plurality of vertical pedestals pivoted to the base at its forward portion for oscillation in a transverse plane relative to the base, a further pedestal to the rear of the others and pivoted at its lower end to the base for oscillation in the longitudinal direction of the base, a frame loosely engaging the pedestals above their pivotal axes, and a mining machine mounted on said frame between the forwardly disposed pedestals whereby oscillatory movements of the latter are limited by abutment of their upper ends with the sides of the machine.

11. In a mining apparatus, a movable base, a plurality of vertical pedestals pivoted to the base at their lower ends, a frame loosely engaging the pedestals above their pivotal axes, and guide members fixed to the base and extending upwardly at each side of the frame.

12. In a machine of the class described, a base member, a plurality of upright pedestals on said base member, each of said pedestals comprising a pair of telescopic tubular elements, means attaching the lower end of one of said pair of elements to the base member, a screw in threaded engagement with one of said elements, a thrust bearing interposed between said screw and the other of said elements whereby the rotation of the screw causes longitudinal displacement of said elements, a flange on the outer of said elements, and a frame resting on the flanges of the outer elements of all of said pedestals.

13. In a machine of the class described, a base member, a plurality of upright pedestals on said base member, each of said pedestals comprising a pair of telescopic tubular elements, means attaching the lower end of one of said pair of elements to the base member, a screw in threaded engagement with one of said elements, a thrust bearing interposed between said screw and the other of said elements whereby the rotation of the screw causes longitudinal displacement of said elements, a flange on the outer of said elements, and a frame having portions loosely embracing the pedestals and resting on the flanges thereof.

14. In a machine of the class described, a base member, a plurality of upright pedestals on said member and disposed at the apices of a triangle, each of said pedestals comprising a pair of telescopic tubular elements, means pivotally attaching the lower end of one of said pair of elements to the base member, a screw in threaded engagement with one of said elements, a thrust bearing interposed between said screw and the other of said elements whereby rotation of the screw causes longitudinal displacement of said elements, a flange on the outer of said elements, and a frame having portions loosely embracing the pedestals and resting on the flanges thereof, the lower elements of two of said pedestals being pivoted on pins extending at right angles to a line connecting the two pedestals, the lower element of the third pedestal being pivoted on a pin extending parallel to said line.

15. In a machine of the class described, a base member, a plurality of upright pedestals on said member and disposed at the apices of the triangle, each of said pedestals comprising a pair of telescopic tubular elements, means pivotally attaching the lower end of one of said pair of elements to the base member, a screw in threaded engagement with one of said elements, a thrust bearing interposed between said screw and the other of said elements whereby rotation of the screw causes longitudinal displacement of said elements, a flange on the outer of said elements, a frame having portions loosely embracing the pedestals and resting on the flanges thereof, the lower elements of two of said pedestals being pivoted on pins extending at right angles to a line connecting the two pedestals, the lower element of the third pedestal being pivoted on a pin extending parallel to said line, and upright guide members at each side of the frame for limiting movement of the latter about said first-mentioned pins.

16. In a machine of the class described, a base element, a drive wheel thereon rotatable on a horizontal axis, a vertically adjustable frame element above the base element, a rotatable drive wheel on the frame element in the plane of the first drive wheel, an endless flexible draft member connecting said wheels, idler wheels engaging the runs of said draft member, mounting means for said idler wheels horizontally movable on one of said elements with the idler wheels in the plane of the drive wheels, and an arm in pivotal connection with said mounting means and the other of said elements, said arm acting to move said mounting means and idler wheels to maintain operative tension of the draft member upon vertical adjustment of the frame element relative to the base element.

In testimony whereof I have hereunto set my hand.

NILS D. LEVIN.